Aug. 15, 1950  E. L. STEMEN ET AL  2,519,002
VERTICALLY ADJUSTABLE TRAILER
Filed Oct. 26, 1948  2 Sheets-Sheet 1
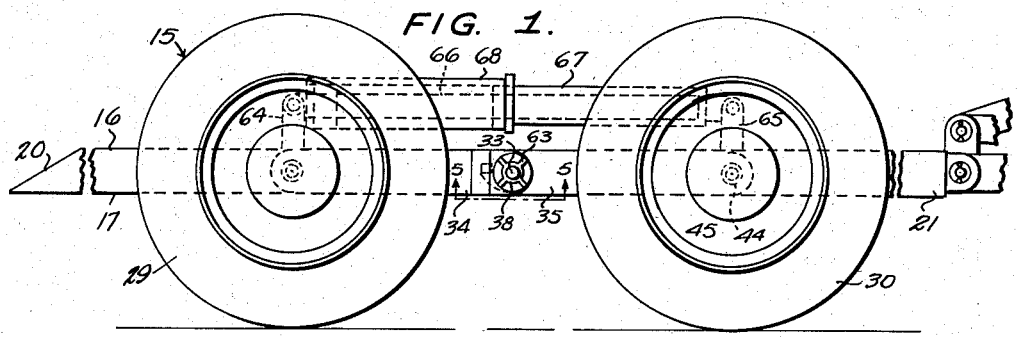
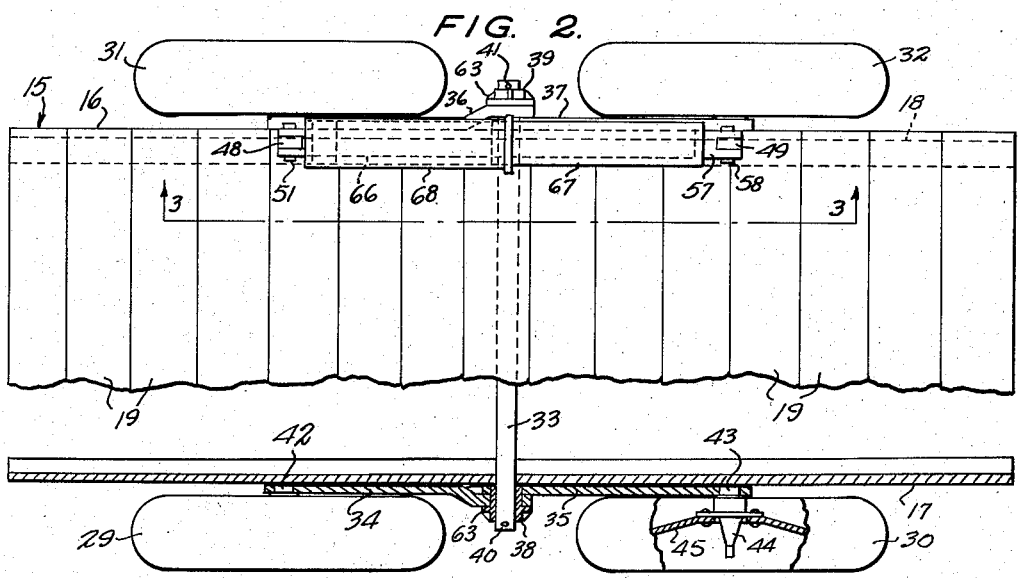
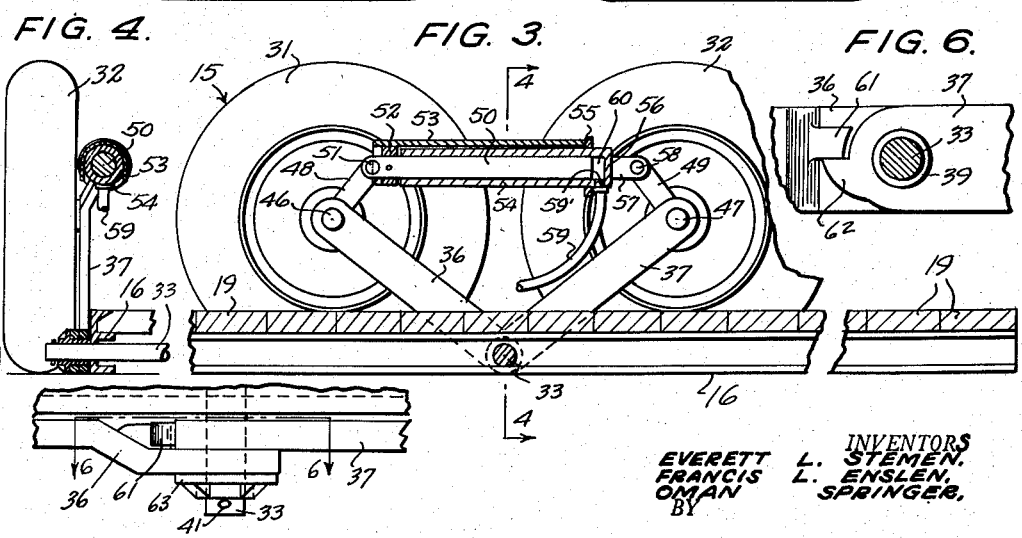
INVENTORS
EVERETT L. STEMEN,
FRANCIS L. ENSLEN,
OMAN SPRINGER,
BY
McMorrow, Berman & Davidson
ATTORNEYS.

Aug. 15, 1950  E. L. STEMEN ET AL  2,519,002
VERTICALLY ADJUSTABLE TRAILER
Filed Oct. 26, 1948  2 Sheets-Sheet 2
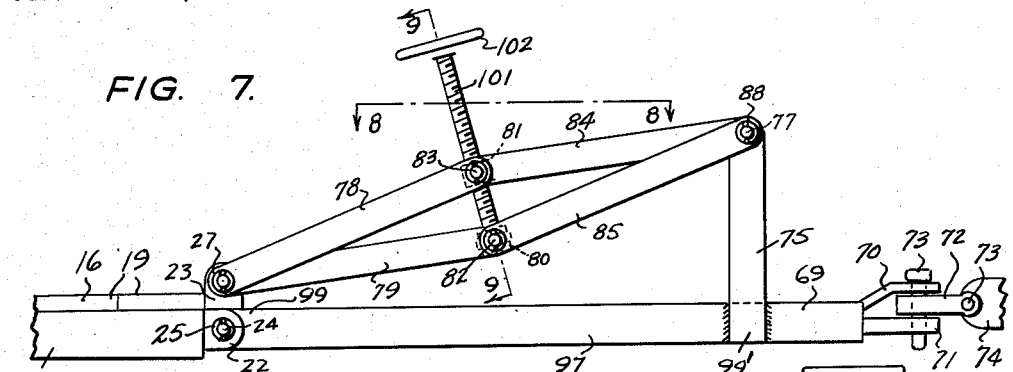
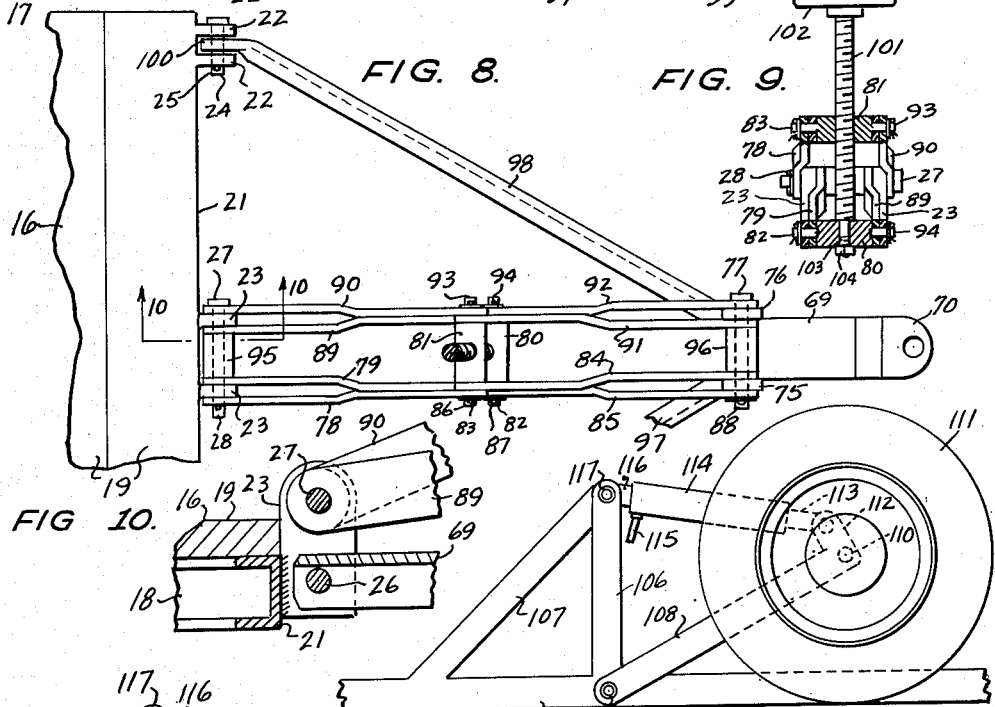
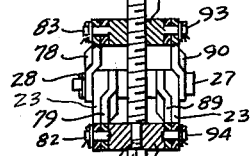
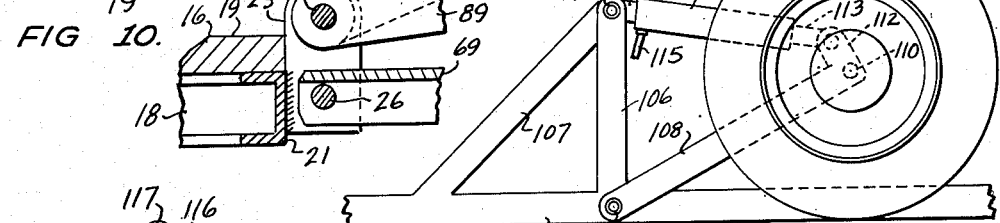
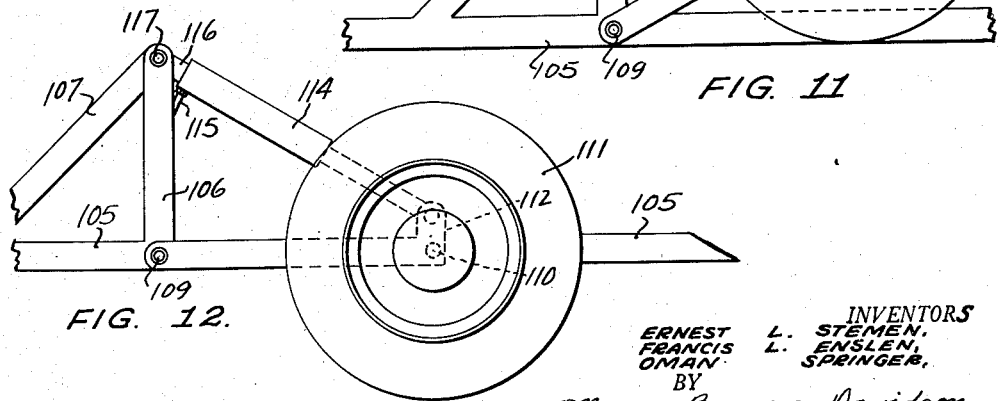
INVENTORS
ERNEST L. STEMEN,
FRANCIS L. ENSLEN,
OMAN SPRINGER,
BY
McMorrow, Berman + Davidson
ATTORNEYS.

Patented Aug. 15, 1950

2,519,002

UNITED STATES PATENT OFFICE 2,519,002

VERTICALLY ADJUSTABLE TRAILER

Everett L. Stemen, Francis L. Enslen, and Oman Springer, Elida, Ohio; said Stemen assignor to said Enslen and said Springer Application October 26, 1948, Serial No. 56,522

2 Claims. (Cl. 280—44)

This invention relates to load-lifting devices for tractor trailers, and particularly to a trailer lift and an adjustable hitch cooperating therewith.

The main object of our invention is to provide a tractor trailer with load-lifting means including an elevating platform for conveniently elevating a load from initial low position to a raised transporting position occupied by the load when the trailer is being drawn by the tractor for transporting the load.

Another object is to provide a trailer with a lift as indicated which is raised in level or horizontal condition while the trailer remains hitched to the tractor.

A further object is to combine an adjustable or tilting hitch means with the lift for the trailer to facilitate loading the lift platform on the latter by allowing the platform to occupy an initial low loading position.

It is also an object to provide distinct means for raising the lift platform and for correspondingly adjusting the relative position of the adjustable hitch in cooperation therewith.

A practical object is, of course, to provide such a combined trailer lift and adjustable hitch in durable and simple, as well as effective form.

Other objects and advantages of our invention will appear in further detail as the specification proceeds.

In order to facilitate ready comprehension of this invention for a proper appreciation of the salient features thereof, the invention is illustrated on the accompanying drawings forming part hereof, and in which:

Figure 1 is a side elevation of a load-carrying trailer provided with a lift platform capable of being raised and lowered according to certain features of the invention;

Figure 2 is a plan view of the same load-carrying trailer shown in Figure 1 with portions shown in section to disclose structural detail;

Figure 3 is a section taken on line 3—3 in Figure 2;

Figure 4 is a vertical section taken on line 4—4 in Figure 3;

Figure 5 is a section taken on line 5—5 in Figure 1;

Figure 6 is a section taken on line 6—6 in Figure 5;

Figure 7 is a side elevation of an adjustable or tiltable hitch whereby to connect the load-carrying trailer of Figures 1, 2 and 3 to a tractor, and particularly adapted to cooperate with the trailer;

Figure 8 is a fragmentary plan view of the adjustable hitch of Figure 7 in partial section, as indicated on line 8—8 in Figure 7;

Figure 9 is a section taken on line 9—9 in Figure 7;

Figure 10 is a section taken on line 10—10 in Figure 8;

Figure 11 is a modification of the load-carrying trailer and lift of Figures 1, 2 and 3, showing the elevating platform thereof in its lowered initial position for loading;

Figure 12 is another side elevation of the same modification of Figure 11, showing the lift platform in raised transporting position.

Throughout the views, the same reference numerals indicate the same or like parts.

Load-carrying trailers are frequently hitched to tractors for transporting farm implements, tools and even farm machinery, as well as other loads, which are often heavy and unwieldy and certainly too heavy and inconvenient for a man to lift and put upon the trailer. Of course, various expedients for loading and unloading such a trailer have been resorted to, but nothing uniform and effective has been generally adopted for this purpose.

Upon considering this problem, it has occurred to us that a tractor trailer should be available which would not only have an elevating platform capable of being lowered to receive a load and then elevated to raise the load to a proper position for transportation, but should also be connected to the trailer by means of an adjustable hitch which will allow the lift platform to occupy a horizontal position whether in lowered or elevated condition. As a result, we have found it quite feasible to produce a special trailer for attachment to a tractor as above outlined which we shall now proceed to describe.

Hence, in the practice of our invention, and referring again to the drawings, a tractor trailer, generally indicated at 15, includes a lift platform 16 consisting of a pair of opposite channel frame members 17, 18 upon which are secured a series of transverse platform boards 19, 19 by screws, bolts, or any other means known in the art, the rear end 20 of this platform being inclined to facilitate pulling various articles up on the platform when the latter is in its initial lowered position. At the forward end the side channel members 16 and 17 are preferably welded to a transverse channel member 21 when the latter is provided upon the ends of the forward side thereof with two pairs of lugs 22, 22, while upon the intermediate portion of the front side of said channel member 21 are a pair of additional lugs 23, 23. Through each of the two pairs of lugs 22, 22 extends a bolt or pivot pin 24 retained in position by a cotter pin 25, while through the two intermediate lugs 23, 23 extends a further pivot pin 26 best seen in Figure 10. The mentioned intermediate lugs 23, 23 extend upwardly and have a further pivot pin 27 extending therethrough above the perviously-mentioned pin 26 being retained in position by a cotter pin 28. The purposes served by the mentioned pins 24, 26 and 27 will presently be explained.

Upon each side of the platform 16 are a pair of supporting wheels 29, 30, 31, 32 for supporting the platform through a pair of special toggle arrangements connected to a transverse shaft 33 intermediate the two resulting pairs of forward and rear wheels 30, 32 and 29, 31, this shaft extending through the intermediate portions of the side channels 17, 18 of the platform, so that the latter is virtually suspended on said shaft. Mounted upon the ends of shaft 33 are a pair of arms 34, 35, 36, 37, a bushing 38 extending through the overlapping inner ends of the two arms 34, 35 and a similar bushing 39 extending through the overlapping adjacent ends of the other two arms 36 and 37, while two pins 40, 41 extend through the ends of the shaft to retain the bushings rotatably upon the latter and prevent displacement thereof, the arms in each case being preferably rotatable upon the mentioned bushing upon which it is mounted. In the outer ends of arms 34 and 35 are fixed a pair of wheel studs or wheel mountings 42, 43, and upon each one of these wheel studs is mounted a rotatable wheel center 44 secured to the disc 45 of wheel 30, for example, the other three wheels 29 and 31 and 32 being similarly mounted upon the ends of the arms 34, 36 and 37, respectively.

As best seen in Figure 3, the arms 36 and 37 are provided at their outer ends with wheel studs 46 and 47 similar to the wheel studs or short axles 42 and 43 just mentioned, while upon the upper portions of the same ends of said arms 36 and 37 are fixed upwardly-extending smaller arms 48, 49. Thus far described, it is evident that platform 16 is suspended from the wheels 29, 30 on one side and 31 and 32 on the other side by means of arms 34, 35 at one end of shaft 33 and arms 36 and 37 at the other end of the same shaft. To the upper end of short arm 48 is pivotally connected a piston 50 by a pivot pin 51 upon which is fixed a ring 52 to which is rigidly secured an inverted U-shaped channel member 53 forming a cover overlying a hydraulic cylinder 54 into which the piston 50 extends reciprocably, the far end of the channel member or canopy 53 having a plate 55 depending therefrom virtually forming a ring surrounding cylinder 54 slidably in such fashion as to retain the channel member 53 in alignment with both piston and cylinder. The closed end 56 of hydraulic cylinder 54 has a projecting lug 57 pivotally connected by means of a pivot pin 58 to the upper end of rigid small arm 48, while to the interior of cylinder 54 is connected hydraulic hose or flexible pipe 59 which in turn is connected to a fixture upon a manually-operated hydraulic pump, or if desired, to a mechanically-driven hydraulic pump (not shown).

The arrangement is such that if pressure fluid enters chamber 60 in hydraulic cylinder 54 from flexible tube or pipe 59, piston 50 will be forced gradually out of the cylinder in such fashion as to separate cylinder and piston to a limited degree which in turn forces pivot pins 51 and 58 and arms 48 and 49 apart, and thereby straightens supporting arms 36 and 37 into alignment from the position shown in Figure 3 to substantially that shown in Figure 1, which automatically raises shaft 33 and platform 16 supported thereon. In order to determine a final raised position, each outer arm 34 or 36, as the case may be, is provided with a stop lug 61, while the other corresponding arm 35 or 37 terminates in a projecting stop lug or nose 62 preventing over operation or raising of shaft 33 beyond a position in which the arms 36 and 37 on one side, as well as arms 34 and 35 on the other side, are substantially in alignment.

It has already been mentioned that the arms 34 and 35 are rotatable upon the bushing 38, but if preferred, this bushing may be rigid with arm 35 and only the inner adjacent end of arm 34 rotatable thereo nand retained in position within cotter pin 40 by means of a washer 63 and similarly on the other side another washer 63 which serves the same purpose.

While the connections between arms 36 and 37 and piston 50 with cylinder 54 have been described in detail, it is self-evident that a corresponding pair of short arms 64, 65 may be fixed upon the outer ends of arms 34 and 35 and connected to piston 66 and cylinder 67, respectively. A canopy or inverted protecting channel member 68 is connected to piston 66 and cylinder 67 also provided with a hydraulic flexible tube or pipe similar to 59, and both tubes are connected together to be controlled simultaneously in order to operate both pairs of arms 34 and 35 on one side and 36 and 37 on the other side in synchronism. When the two pairs of arms are thus simultaneously operated, platform 16 is raised from the initial low position illustrated in Figure 3 for loading to the raised position illustrated in Figure 1, which is the normal transporting position in which the load is supported at its efficient height above the road to avoid any inequalities of the latter or when running through fields all inequalities of the ground, shrubs and the like, are avoided by passing beneath the platform and between the wheels on both sides.

For connecting the hydraulic lines or hose members 59 to the hydraulic cylinders 54 and 67, it is preferred to use quick-connecting and disconnecting fittings represented by 59', so that it will be possible to disconnect either or both lines from the cylinders without delay or difficulty and also remove either or both sets of wheels at either side of lift platform 16 by removing pin 40 and washer 63 from spindle 33 to release arms 36 and 37 from the latter. The temporary removal of these arms naturally includes removal of wheels 29 and 30 therewith, which allows loading of any object upon the platform from the side when such object is too wide for loading on the platform from the end 20 of the latter. Obviously, when this wide object is located on the platform, arms 36 and 37 carrying wheels 29 and 30 are then replaced with washer 63 and pin 40 upon spindle 33, and hydraulic line 59 also snapped into conection with cylinder 54 again by means of fitting 59', so that the ensemble is completely restored for normal operation.

In order to cooperate with the lift apparatus just described, the hitch bar 69, as best seen in Figures 7 and 8, is connected at the rear end thereof by means of previously-described pin 26 between lugs 23 on the front end 21 of platform 16, while at the forward end this hitch bar, which is preferably a channel member, has a pair of forwardly-extending lugs 70, 71 adapted to be attached to a rear end hitch ring or loop 72 by means of a hitch pin 73 extending down through lugs 70 and 71, as well as ring or loop 72. This member 72 is pivotally connected by means of a transverse or horizontal pin 73 to the rear end of fixed hitch member 74 of a tractor for the purpose of transporting the trailer 15 already described by means of hitch bar 69.

From the forward portion of the mentioned hitch bar 69 extend a pair of perpendicular flat uprights 75, 76 having a transverse pivot pin 77 extending therethrough, the lower ends of the uprights 75 and 76 being preferably welded to the hitch bar a short distance rearwardly of the hitch lugs 70 and 71, at 99'. Intermediate the upper portions or ends of lugs 23 upon the front end 21 of platform 16 and the upper ends of uprights 75 and 76 are mounted a pair of toggle systems above each side of hitch bar 69. Thus, as viewed in Figures 7 to 10, upon the near side are pivotally connected a pair of toggle links 78, 79 by means of previously-mentioned pin 27 to one of the intermediate lugs 23, while a corresponding pair of toggle blocks 80, 81 are pivotally mounted with the studs 82, 83 thereof extending through the forward ends of the mentioned links 78, 79. Upon the same studs 82, 83 are pivotally mounted a pair of forwardly-directed toggle links 84, 85, while cotter pins 86, 87 serve to retain both sets of links 78, 79, 84, 85 in assembled positions on the mentioned studs. At their forward ends, the last-mentioned two links 84 and 85 are pivotally connected to one of the near uprights 75 by means of previously-mentioned transverse pins 77 and retained in place by cotter pin 88.

In similar fashion, to the connections of links 78, 79, 84, 85, a duplicate system of links 89, 90, 91, 92 are mounted upon the opposite studs 93, 94 on the far sides of toggle blocks 80, 81, the rear ends of links 89, 90 being mounted upon opposite sides of the other of the two intermediate lugs 23 on mentioned pin 27 with a spacing tube or bushing 95 mounted on pin 27 between links 79 and 89. Upon the opposite sides of the far upright 76 are mounted the forward ends of links 91, 92 on pin 77 with a spacing tube or bushing 96 disposed on pin 77 between links 84 and 91. In order to maintain the true forward direction of hitch bar 69 in line with the direction of travel of the tractor, a pair of rearwardly-diverging brace bars 97, 98 are preferably welded or brazed at 99' on both sides of bar 69, and at the lower junctions of uprights 75, while the rearward ends 99 and 100 of the diverging braces 97 and 98 are disposed between the two pairs of lugs 22, 22 at each side of the forward end of platform 16 and each end 99 and 100 having a pin 24 extending therethrough to couple the same pivotally to lugs 22, these pins being substantially in line with the previously-described lower pin 26 connecting hitch bar 69 to lugs 23.

Threaded through an internally-threaded hole in upper toggle block 81 is a manually-operated feed screw 101 provided with a hand wheel 102 by which to manipulate it, the lower end of the feed screw resting rotatably upon the lower toggle block 80 and having a reduced end 103 extending rotatably through block 80 and having a nut 104 screwed on a threaded end upon reduced portion 103 to retain the feed screw 101 assembled with the mentioned lower toggle block 80, although allowing the feed screw to be rotated in such fashion as to raise or lower upper toggle block 81 with respect to lower toggle block 80 according to the direction of rotation of the feed screw imparted by the hand wheel 102. Viewing Figure 7, and assuming that feed screw 101 has a right-hand thread, clockwise rotation of hand wheel 102 will cause upper toggle block 81 to travel upward along the feed screw separating it from the lower toggle block 80, thus separating the lower links 79, 85 and 89, 91 from links 78, 84 and 90, 92 in such fashion as to shorten the distance between pivot center 27 and pivot center 77. Due to the fact that the intermediate lugs 23 are rigid with the forward end of platform 16, such shortening of the distance will cause uprights 75, 76 and hitch bar 69 with its braces 97, 98 to be drawn upward counter-clockwise about pins 24, 26, so that hitch bar 69 will assume an upwardly-inclined position toward the right. Such adjustment allows platform 16 of the lift apparatus to be lowered, and in fact, when the latter is lowered to contact with the ground, further adjustment of the feed screw 101 will allow the platform to remain flat on the ground in horizontal position, while hitch bar 69 still remains connected both to the platform at the rear end thereof and to the hitch member 74 on the tractor through the pivoted ring or loop 72. When the platform is again to be raised after being properly loaded, the hydraulic systems of the platform are operated to raise it, while hand wheel 102 is rotated counter-clockwise in order to draw the lower and the upper links together and thereby increase the distance between the pins 27 and 77 and thus allow hitch bar 69 with its braces 97, 98 to lower to horizontal position which virtually amounts to raising the rear end 99, 100 of both braces and the rear end of the hitch bar to correspond to the raised position of elevating platform 16, with the result that hitch bar 69 and platform 16 are brought virtually in line to assume horizontal aligned positions.

A modification of the hydraulic system and platform of Figures 1 to 6 is shown in Figures 11 and 12, wherein the platform is provided with upright posts 106 and rearwardly-inclined braces 107, while to the platform immediately below uprights or posts 106 are pivoted arms 108 by pivots 109, the other ends of arms 108 carrying stud shafts 110 for wheels 111, the same ends of arms 108 being provided with upwardly-extending rigid short arms 112 to which are pivotally connected a pair of hydraulic pistons or plungers 113 extending reciprocably into hydraulic cylinders 114 connected by flexible tubes 115 to a hydraulic pump and provided with rigid lugs 116 pivotally connected by pivots 117 to the upper ends of posts or uprights 106. When hydraulic fluid is supplied to the interior of hydraulic cylinders 114, pistons 113 are projected therefrom so that beginning with the position of platform 105 substantially on the ground for loading, the pistons will be projected as shown best in Figure 12 in such fashion as to rotate arms 108 clockwise and thereby raise platform 105 into transporting position.

Manifestly, variations may be resorted to and parts and features may be modified or used without others within the scope of the appended claims.

Having now fully described our invention, we claim:

1. A tractor trailer adapted to be hitched to a tractor including a lift platform, a horizontally disposed shaft fixedly secured transversely of said lift platform intermediate its ends and having its opposed ends projecting from the sides of said platform, a first pair of arms having one end pivotally connected to the adjacent projecting end of said shaft, a first pair of stubshafts arranged in spaced relation with respect to said first named shaft and spaced from each other, said pair of stubshafts each having one end fixedly secured to the other end of each of said arms, a second pair of arms having one end pivotally connected to the other projecting end of said first named shaft, a second pair of stubshafts arranged in spaced relation with respect to said first named shaft and spaced from each other, said second named pair of stubshafts each having one end fixedly secured to the other end of each of said second named arms, a wheel rotatably mounted on the other end of each of said first and second named stubshafts, and hydraulic means interposed between each of said first and second named pairs of stubshafts and operatively connected thereto for effecting movement of the stubshafts of each of said pairs of stubshafts toward and away from each other.

2. A tractor trailer adapted to be hitched to a tractor including a lift platform, a horizontally disposed shaft fixedly secured transversely of said lift platform intermediate its ends and having its opposed ends projecting from the sides of said platform, a first pair of arms having one end pivotally connected to the adjacent projecting end of said shaft, a first pair of stubshafts arranged in spaced relation with respect to said first named shaft and spaced from each other, said pair of stubshafts each having one end fixedly secured to the other end of each of said arms, a second pair of arms having one end pivotally connected to the other projecting end of said first named shaft, a second pair of stubshafts arranged in spaced relation with respect to said first named shaft and spaced from each other, said second named pair of stubshafts each having one end fixedly secured to the other end of each of said second named arms, a wheel rotatably mounted on the other end of each of said first and second named stubshafts, and hydraulic means interposed between each of said first and second named pairs of stubshafts and operatively connected thereto for effecting movement of the stubshafts of each of said pairs of stubshafts toward and away from each other, said last named means comprising a cylinder operatively connected to one of each of said pairs of stubshafts, a piston having one end operatively connected to the other end of each of said pairs of stubshafts and having the other end slidably mounted within said cylinder, and means for introducing fluid under pressure into said cylinder for effecting said movement of said stubshafts.

EVERETT L. STEMEN.
FRANCIS L. ENSLEN.
OMAN SPRINGER.

REFERENCES CITED

The following references are of record in the file of this patent:

UNITED STATES PATENTS

| Number | Name | Date |
|---|---|---|
| 1,105,228 | Wickey | July 28, 1914 |
| 1,633,473 | Bush | June 21, 1927 |
| 2,002,605 | Kincaid | May 28, 1935 |
| 2,196,338 | McDaniel | Apr. 9, 1940 |
| 2,227,762 | Ronning | Jan. 7, 1941 |
| 2,297,992 | Swim | Oct. 6, 1942 |
| 2,328,343 | Jacob | Aug. 31, 1943 |
| 2,385,253 | Black | Sept. 18, 1945 |
| 2,411,009 | Slimp | Nov. 12, 1946 |